G. A. W. REVERMANN.
SHOVEL STOKER.
APPLICATION FILED DEC. 20, 1921.

1,438,785.

Patented Dec. 12, 1922.

INVENTOR
GUSTAAF ANTON WILHELM REVERMANN
BY
ATTORNEYS

Patented Dec. 12, 1922.

1,438,785

UNITED STATES PATENT OFFICE.

GUSTAAF ANTON WILHELM REVERMANN, OF UTRECHT, NETHERLANDS.

SHOVEL STOKER.

Application filed December 20, 1921. Serial No. 523,704.

*To all whom it may concern:*

Be it known that I, GUSTAAF ANTON WILHELM REVERMANN, a subject of the Queen of the Netherlands, residing at Utrecht, Netherlands, have invented certain new and useful Improvements in Shovel Stokers, of which the following is a specification.

The application of shovel or sprinkling stokers to water tube boilers and fire tube boilers meets the inconvenience that the height of the space below the tubes is generally not sufficient to accommodate such stokers which, as is well known to those skilled in the art, must be amply dimensioned in order that they may operate in a satisfactory manner.

It has already been suggested, in order to obviate this disadvantage, to dispense with the fire door ordinarily provided below the shovel stoker and above the grate to render the fire readily accessible, and to let the shovel for throwing the fuel from a cylindrical dish plate onto the fire also act as a fire door. This suggestion, however, is not practical in that the shovel cannot completely shut off the furnace. Moreover, the arrangement of the fuel dish plate substantially at a level with the grate causes part of the fuel to fall on the dead grate area, where it cannot be burnt and on which it gradually collects in the form of a heap which requires to be periodically removed by hand.

Now, my present invention has for its object to improve known types of shovel stokers in such a manner as to render them suitable for ordinary water tube and fire tube boilers and to avoid the disadvantages inherent to such stokers.

With this object in view I adapt the the shovel and the ordinary parts associated therewith, to wit the shovel shaft, the shovel spring, the spring lever arm and the spring support, and contingently also part of the front wall of the stoker for upward swinging motion, and I mount the shovel shaft eccentrically relative to the pivot of the spring support in such a manner as to cause the tension of the shovel spring to gradually decrease when the said support is swung. Furthermore, I preferably provide the end of the spring support with a latch held by the shovel spring and adapted to lock the spring support in its operative position.

In a stoker constructed in accordance with my invention the shovel spring has a tendency to hold the hinged portion in its fully opened position, and also in its intermediate positions. Moreover, when the hinged portion is swung up the shovel spring counteracts the gravitation so as to prevent said portion from freely falling down into its closed position after being released.

Figure 1:
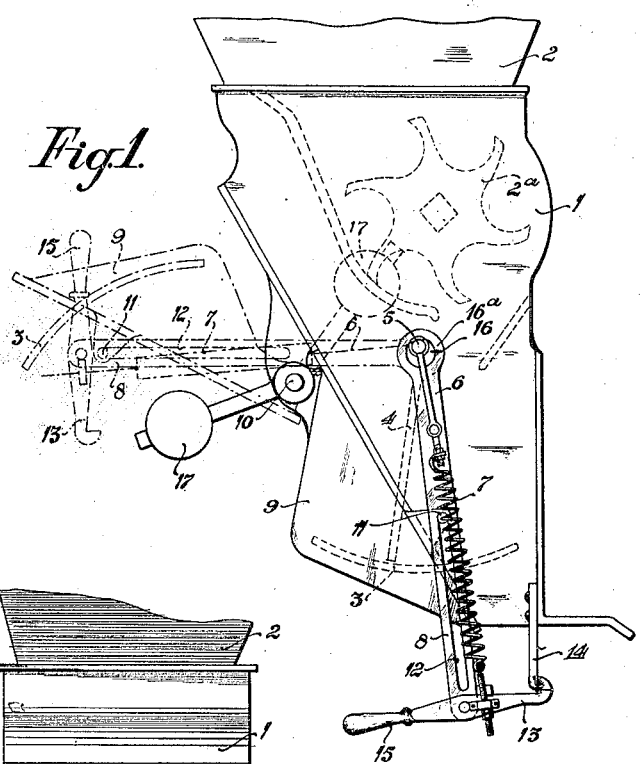
Figure 2:
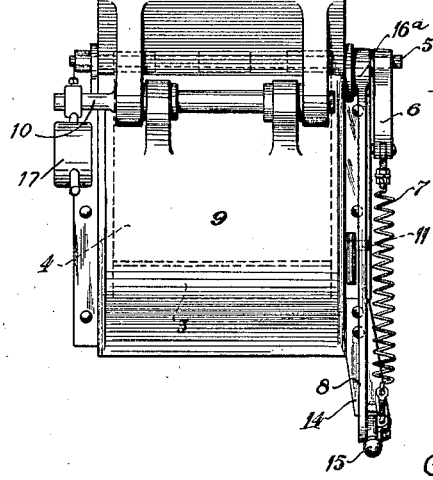

The annexed drawing illustrates a shovel stoker constructed in accordance with my present invention, Figure 1 being a side elevational view, and Figure 2 a front elevational view, the crusher and shovel mechanism being omitted. While means for actuating the crusher and shovel form no part of the present invention these means should be of well known form; or such as are shown in applicant's Patent No. 1362266 granted December 20, 1920 may be used if preferred.

1 is the casing into which fuel is adapted to be fed through a hopper 2 provided in known manner with a crusher 2$^a$. After being suitably reduced by said crusher, the fuel falls onto a dished fuel feed plate 3, whence it is thrown on the fire by impacts imparted thereto by the shovel 4 in a manner well known to those skilled in the art. The shovel 4 is keyed or in any suitable manner secured to the shovel shaft 5, to one end of which is keyed or in any suitable manner secured a lever arm 6 engaged by one end of the usual coiled shovel spring 7 for imparting movement to the shovel. The other end of the shovel spring is secured to the latch 13 pivoted to the spring support 8 and adapted to engage the arm 14, on the casing to lock said support against movement.

The portion 9 of the front wall, to which the dished fuel feed plate 3 is attached, is mounted to swing on a horizontal shaft 10. Said portion is provided with a pin 11 projecting into a longitudinal slot 12 of the support 8, so that the support will swing the portion 9. When the support 8 assumes the position shown in full lines in Figure 1, it is locked by means of a latch 13, engaging the arm 14, and is held in engagement therewith by the shovel spring 7. The front end of latch 13 is in the form of a handle 15, and by moving this handle upwards the latch may be released.

The portion 9 of the front wall with the parts associated thereto is counterbalanced by a counterweight 17. When said portion and the adjacent parts are swung up to the dotted line position for inspection of the fire they are held in this position by the action of spring 7, and for this purpose the support 8 is mounted eccentrically in respect to shaft 5. That is to say shaft 5 is supported in an eccentric bore hole of the cylindrical trunnion 16 engaged by an eye 16ª at the end of support 8, the different parts being so dimensioned that when the front wall portion 9 with associate parts is swung up the length of spring 7 gradually decreases. In other words the shaft 5 is pivoted in the cylindrical trunnion 16, and the spring support 8 about it, the said trunnion being fixed to the frame. It will thus be understood that when the said portion is swung into its closed position, the tension of the spring is gradually increased whereby the gravitation is counteracted.

What I claim is:—

1. In a shovel stoker, a casing having a hinged portion, a shaft mounted in said casing, a shovel secured to said shaft, a lever arm also secured to said shaft, a spring having its one end attached to said lever arm, and a support to which the other end of the spring is attached, said support being connected with the hinged portion of the casing and mounted for swinging motion about an axis eccentrically located with respect to said shaft in such a manner that when said support is swung in an upward direction the spring tension is reduced, and vice versa.

2. In a shovel stoker, a casing, a shaft mounted in said casing, a shovel secured to said shaft, a lever arm also secured to said shaft, a spring having its one end attached to said lever arm, a support to which the other end of the spring is attached, a second horizontal shaft on which portion of the front wall of said casing is adapted to swing, and a sliding connection between said front wall portion and the support, the latter being mounted for swinging motion about an axis eccentrically located with respect to said shaft in such a manner that when said support is swung in an upward direction the spring tension is reduced, and vice versa.

3. In a shovel stoker, a casing having a hinged front portion, a shaft mounted in said casing, a shovel secured to said shaft, a lever arm also secured to said shaft, a support having a movable connection with the hinged front, a spring having one end attached to the lever arm and the other end secured to the support, a cylindrical trunnion, said shaft being eccentrically supported in said trunnion, said support mounted for swinging motion about an axis eccentrically located with respect to said shaft in such manner that when said support is swung in an upward direction the spring tension is reduced and vice versa.

4. In a shovel stoker, a casing having a hinged portion, a shaft mounted in said casing, a shovel secured to said shaft, a lever arm also secured to said shaft, a spring having its one end attached to said lever arm, a support having a sliding connection with the hinged portion of the casing, a latch secured to said support and engaged by the other end of the spring, said support being mounted for swinging motion about an axis eccentrically located with respect to said shaft in such a manner that when said support is swung in an upward direction the spring tension is reduced, and vice versa.

In testimony whereof I affix my signature.

GUSTAAF ANTON WILHELM REVERMANN.